(12) United States Patent
Hawkins et al.

(10) Patent No.: US 10,942,533 B2
(45) Date of Patent: Mar. 9, 2021

(54) SYSTEM FOR MULTIPLE PRESSURE RELIEF DEVICE ACTIVATION

(71) Applicant: Hexagon Technology AS, Alesund (NO)

(72) Inventors: Michael Hawkins, Lincoln, NE (US); Chad Cederberg, Lincoln, NE (US)

(73) Assignee: HEXAGON TECHNOLOGY AS, Alesund (NO)

( * ) Notice: Subject to any disclaimer, the term of this patent is extended or adjusted under 35 U.S.C. 154(b) by 0 days.

(21) Appl. No.: 16/270,935

(22) Filed: Feb. 8, 2019

(65) Prior Publication Data

US 2019/0250650 A1 Aug. 15, 2019

Related U.S. Application Data

(60) Provisional application No. 62/630,409, filed on Feb. 14, 2018.

(51) Int. Cl.
*F16K 17/38* (2006.01)
*G05D 16/18* (2006.01)
*F16K 31/00* (2006.01)

(52) U.S. Cl.
CPC ............. *G05D 16/18* (2013.01); *F16K 17/38* (2013.01); *F16K 31/002* (2013.01);
(Continued)

(58) Field of Classification Search
CPC ....... F17C 2205/0332; Y10T 137/1963; Y10T 137/2514; Y10T 137/2559
See application file for complete search history.

(56) References Cited

U.S. PATENT DOCUMENTS 2,072,577 A * 3/1937 Allen ................. A62C 99/0027
169/11
2,557,199 A 6/1951 Olson
(Continued)

FOREIGN PATENT DOCUMENTS

DE 10 2017 200 467 A1 7/2018
EP 2000719 A1 12/2008
(Continued)

OTHER PUBLICATIONS

International Search Report and Written Opinion from corresponding International application No. PCT/US2019/017471, dated May 16, 2019.

*Primary Examiner* — Robert K Arundale
(74) *Attorney, Agent, or Firm* — Mai-Tram D. Lauer; Westman, Champlin & Koehler, P.A.

(57) ABSTRACT

A system includes a first valve fluidly connected to a first vessel and a second valve fluidly connected to a second vessel. The first valve includes a body and a piston. The body includes first and second ports and a bore having a longitudinal axis. The first port is in communication with the bore and an interior of the first vessel. The second port is in communication with the bore, the second valve, and an atmosphere exterior to the first vessel. The piston is movable along the longitudinal axis of the bore. A first position of the piston blocks the first port; a second position of the piston allows fluid communication between the first and second ports. The first valve is configured so that fluid pressure from the second valve, communicating through the second port, urges the piston to the second position.

13 Claims, 4 Drawing Sheets

(52) U.S. Cl.
CPC .............. *F17C 2205/0134* (2013.01); *F17C 2205/0142* (2013.01); *F17C 2205/0317* (2013.01); *F17C 2205/0326* (2013.01); *F17C 2205/0332* (2013.01); *F17C 2260/042* (2013.01); *Y10T 137/1963* (2015.04)

(56) References Cited

U.S. PATENT DOCUMENTS

| | | |
|---|---|---|
| 3,043,331 A | 7/1962 | Peters |
| 4,224,994 A * | 9/1980 | Tone ............... A62C 13/70 169/88 |
| 4,577,607 A | 3/1986 | Nishio |
| 4,608,208 A | 8/1986 | Yogo |
| 4,699,171 A | 10/1987 | Sugden |
| 4,717,072 A * | 1/1988 | Girardin ............ F16K 11/0716 239/75 |
| 5,042,520 A * | 8/1991 | Reznik ............... F17C 13/123 137/72 |
| 5,131,424 A | 7/1992 | Heidorf |
| 5,211,371 A | 5/1993 | Coffee |
| 5,255,809 A | 10/1993 | Ervin |
| 5,345,963 A | 9/1994 | Dietiker |
| 5,531,275 A * | 7/1996 | Sundholm ............ A62C 31/05 169/16 |
| 5,632,297 A | 5/1997 | Sciullo |
| 5,657,824 A | 8/1997 | Sundholm |
| 5,788,212 A | 8/1998 | Hackman |
| 6,247,678 B1 | 6/2001 | Hines |
| 6,257,360 B1 * | 7/2001 | Wozniak ............. B60K 15/013 180/69.5 |
| 6,269,830 B1 | 8/2001 | Ingle |
| 6,679,263 B2 | 1/2004 | Luchetti |
| 6,793,199 B2 | 9/2004 | Bushik |
| 6,840,257 B2 | 1/2005 | Dario |
| 6,843,465 B1 | 1/2005 | Scott |
| 6,871,802 B2 * | 3/2005 | Stilwell ................ F16K 1/305 169/19 |
| 7,487,826 B2 | 2/2009 | Pineo |
| 7,762,272 B2 | 7/2010 | Delfino |
| 7,815,161 B2 | 10/2010 | Saitoh |
| 7,971,651 B2 | 7/2011 | Tanju |
| 8,414,366 B2 | 4/2013 | Browne |
| 8,646,540 B2 * | 2/2014 | Eckholm ............... A62C 35/13 169/85 |
| 8,668,110 B1 | 3/2014 | Traxler |
| 8,714,199 B2 | 5/2014 | Deperraz |
| 8,720,722 B2 | 5/2014 | Sunday |
| 8,820,069 B2 | 9/2014 | Makinson |
| 8,851,443 B2 | 10/2014 | Foshansky |
| 9,097,358 B2 | 8/2015 | Girouard |
| 9,121,521 B2 | 9/2015 | Girouard |
| 9,404,598 B2 | 8/2016 | Girouard |
| 2012/0199764 A1 | 8/2012 | Girouard |
| 2016/0033085 A1 * | 2/2016 | Sirosh .................. F17C 13/12 137/2 |

FOREIGN PATENT DOCUMENTS

| | | |
|---|---|---|
| WO | 2004014683 A1 | 2/2004 |
| WO | 2010101976 A1 | 9/2010 |

* cited by examiner

SYSTEM FOR MULTIPLE PRESSURE RELIEF DEVICE ACTIVATION

CROSS-REFERENCE TO RELATED APPLICATION

This application claims the benefit of priority from U.S. Provisional Patent Application No. 62/630,409, filed Feb. 14, 2018 by Hexagon Technology AS for a "System for Multiple Pressure Relief Device Activation"; this priority application is hereby incorporated by reference in its entirety.

BACKGROUND

In high pressure tank arrays, efficient evacuation systems are necessary in case of an emergency, such as a fire, for example. High pressure tank arrays are made up of composite wound pressure vessels that are connected together with plumbing to act as a large fuel reservoir. Such tank systems can be stationary or mobile, stand-alone as storage for a filling station, or part of a vehicle fuel system to power a vehicle. Evacuation systems are the means by which the pressure vessel contents can be expelled and depressurized in an emergency in order to keep the pressure vessels from rupturing when they are overheated (as in a fire) or exposed to other adverse conditions or events.

SUMMARY

In one aspect, a system includes some number of valves configured to permit fluid flow out of cylinders in response to emergency conditions. For the sake of this disclosure, a system will be considered to have at least two valves configured to cover two vessels separately. A vessel may include multiple individual cylinders so long as the cylinders are in fluid communication through a shared evacuation vent conduit. The first valve is fluidly connected to a first vessel, and the second valve is fluidly connected to a second vessel. The first valve includes a first port, and a second port, and a mechanism that separates communication between the two ports (such as a piston in one example). The first port is in fluid communication with the interior of the first vessel. The second port is in fluid communication with the second valve, and in fluid communication with an atmosphere exterior to the first vessel. In one example, the separating mechanism is a piston with physical movement, though other mechanisms may be used. The piston is disposed within the bore and is movable along the longitudinal axis. A first position of the piston blocks the first port, and a second position of the piston allows fluid communication between the first port and the second port. In one example, the first valve is configured so that fluid pressure from the second valve communicating through the second port urges the piston to the second position.

In another aspect, a method for sympathetic opening for a first valve with fluid pressure from a second valve is described. In a system including the first valve and the second valve, the first valve is fluidly connected to a first vessel, and the second valve is fluidly connected to a second vessel. The first valve includes a body and a piston. The body includes a first port and a second port. The first port is in fluid communication with the first vessel. The second port is in fluid communication with the second valve, and in fluid communication with an atmosphere exterior to the first vessel. A first position of the piston blocks the first port, and a second position of the piston allows fluid communication between the first port and the second port. The method includes urging the piston to the second position when the second valve is open. This movement of the piston can be accomplished by communicating fluid pressure from the second valve through the second port of the first valve, causing mechanical movement of the piston. This movement of the piston may also come from an electric signal being passed to the first valve upon opening of the second, and causing mechanical movement of the piston.

This disclosure, in its various combinations, either in apparatus or method form, may also be characterized by the following listing of items:

1. A system including a first valve and a second valve, the first valve fluidly connected to a first vessel and the second valve fluidly connected to a second vessel, the first valve including:
    a body including:
        a bore;
        a first port in fluid communication with the bore and an interior of the first vessel;
        and a second port in fluid communication with the bore, in fluid communication with the second valve, and in fluid communication with an atmosphere exterior to the first vessel;
    a piston movably disposed within the bore, wherein:
        a first position of the piston blocks the first port; and
        a second position of the piston allows fluid communication between the first port and the second port;
    wherein the first valve is configured so that opening of the second valve urges the piston to the second position.
2. The system of item 1 including a trigger element connected to the piston and having two states, wherein:
    the piston is in the first position when the trigger element is in a first state; and
    exposure of the trigger element to a threshold condition causes the trigger element to urge the piston to the second position.
3. The system of item 2, wherein the trigger element is a shape memory alloy element, wherein:
    at least a portion of the shape memory element is positioned along the first vessel; and
    the threshold condition is a temperature at or exceeding a transition temperature of the shape memory alloy element.
4. The system of any of items 1-3 including a solenoid configured to push the piston from the first position to the second position.
5. The system of any of items 1-4 including a trigger conduit through which the fluid pressure from the second valve is communicated to the second port of the first valve.
6. The system of item 5 including:
    a vent conduit; and
    a connector between the second port, the trigger conduit, and the vent conduit.
7. The system of item 6 wherein the connector opens fluid communication between the trigger conduit and the second port until a threshold pressure level in the trigger conduit is reached.
8. The system of item 7 wherein the connector opens fluid communication between the trigger conduit and the vent conduit when the threshold pressure level in the trigger conduit is exceeded.
9. The system of any of items 7-8 wherein the connector opens fluid communication between the second port and the vent conduit when the threshold pressure level in the trigger conduit is exceeded.

10. A method for opening a first valve with fluid pressure from a second valve, in a system including the first valve and the second valve, the first valve fluidly connected to a first vessel and the second valve fluidly connected to a second vessel, the first valve including:
- a body including:
  - a bore;
  - a first port in fluid communication with the bore and an interior of the first vessel;
  - and a second port in fluid communication with the bore, in fluid communication with the second valve, and in fluid communication with an atmosphere exterior to the first vessel;
- a piston disposed within the bore, wherein:
  - a first position of the piston blocks the first port; and
  - a second position of the piston allows fluid communication between the first port and the second port;
- the method including urging the piston to the second position by communicating fluid pressure from the second valve through the second port.

11. The method of item 10 further including moving the piston from the first position to the second position.

12. The method of item 11 wherein exposure of at least a portion of a fusible element to a temperature at or exceeding its fusible transition temperature urges the piston to its second position.

13. The method of any of items 10-12 further including pushing the piston from the first position to the second position.

14. The method of item 13 wherein the system includes a solenoid that is activated for pushing the piston.

15. The method of any of items 10-14 wherein the system further includes a trigger conduit through which the fluid pressure from the second valve is communicated to the second port, the method including:
- setting a threshold fluid pressure in the trigger conduit; and
- venting fluid from the trigger conduit when the threshold fluid pressure is exceeded.

16. The method of item 15 further including venting fluid through the first valve when the threshold fluid pressure is exceeded.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views. It is contemplated that all descriptions are applicable to like and analogous structures throughout the several embodiments.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art that fall within the scope of the principles of this disclosure.

The figures may not be drawn to scale. In particular, some features may be enlarged relative to other features for clarity. Moreover, where terms such as above, below, over, under, top, bottom, side, right, left, vertical, horizontal, etc., are used, it is to be understood that they are used only for ease of understanding the description. It is contemplated that structures may be oriented otherwise.

DETAILED DESCRIPTION

This disclosure describes a more reliable and efficient evacuation system that allows pressure release devices (PRD) in the system to trigger, in addition to their primary response to an emergency condition, as a result of a reaction to complementary PRD's effectively acting in a sympathetic mode to one another.

The disclosed concept relates to a system of pressure relief device or pressure release device (PRD) actuators or valves that can vent a pressure vessel as a result of overheating of that particular pressure vessel, as well as in a sympathetic mode in which multiple connected pressure vessels are simultaneously vented in response to the overheating of any one of the pressure vessels that are connected in the system.

Figure 1:
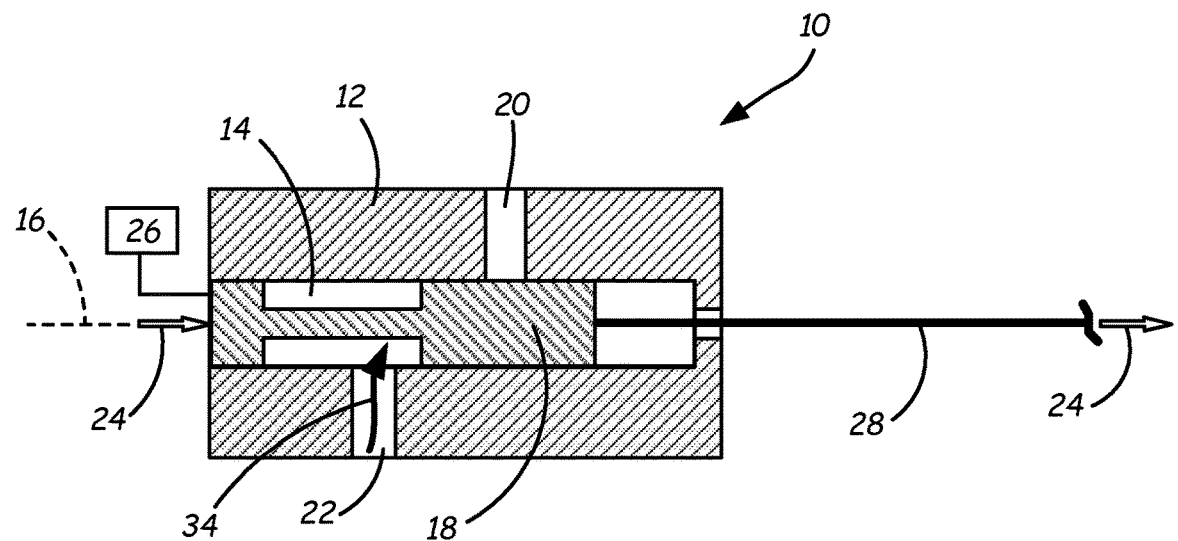
FIG. 1 is a schematic cross-sectional view of an exemplary pressure release device suitable for use with the disclosed system. The pressure release device shown in FIG. 1 is shown in a closed configuration.
Figure 2:
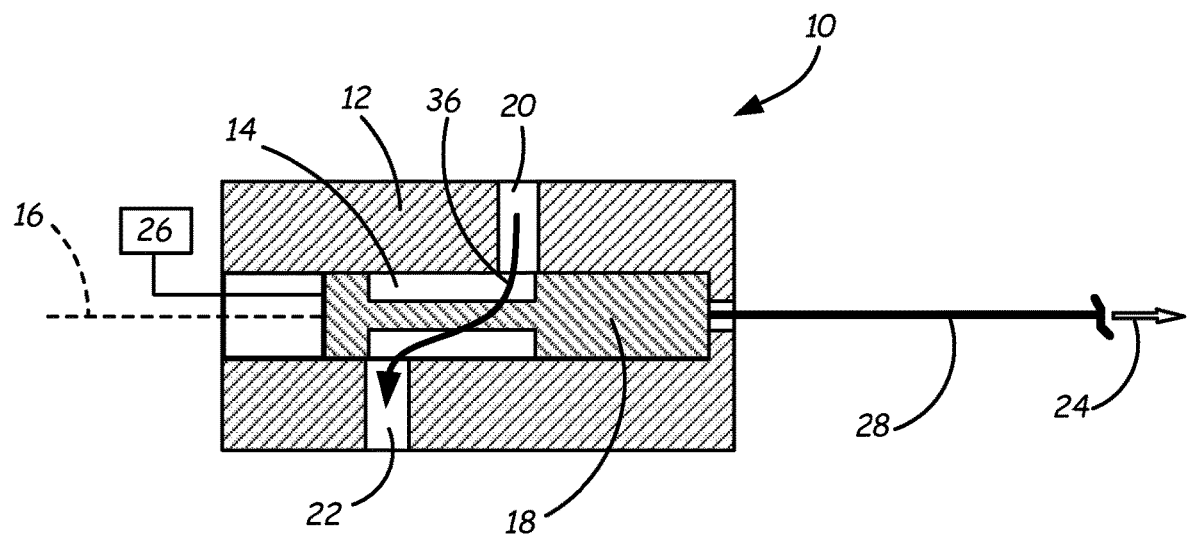
FIG. 2 is similar to FIG. 1 but shows the pressure release device in an open configuration.

An individual pressure vessel has a high pressure live port in selective communication with a vent port. In an exemplary embodiment, a trigger element of the PRD is located along an outside surface of the pressure vessel. For the purpose of example only, the trigger elements of the PRDs represented in the figures include a shape memory alloy (SMA). The focus of this disclosure is in the sympathetic triggering of PRDs and not in the specific design of the trigger element. In an example in which the trigger element is a SMA wire, if the temperature in the vicinity of any pressure vessel increases past its transition temperature, the trigger element allows shifting of the piston of a pressure relief actuator (to the right as illustrated in FIGS. 1 and 2), thereby opening communication between the high pressure live port and the vent line. Thus, in one mode, the PRD is actuated by a trigger mechanism such as a heat-activated solenoid, shape memory alloy wire, or fusible element.

In an exemplary embodiment, the vent lines of the multiple pressure vessels of the system are connected so that increased pressure in the vent line (caused by the venting of high-pressure contents of one pressure vessel) can also push the piston of other system-connected PRDs to the right, thereby venting all other connected pressure vessels in the system. Accordingly, a second mechanism for actuation is through sympathetic back pressure activation of all the PRDs connected to the pressure vessels in the system, in response to activation of any one of the PRDs due to high heat. While a particular actuation mechanism of the exemplary PRD is described, it is contemplated that the teachings of sympathetic back pressure activation described herein can also be applied to other actuators that have different mechanisms than those specifically described.

FIG. 1 is a schematic view of a cross section of an exemplary pressure release device or pressure relief device (PRD) that can be used in a system as disclosed. While the illustrated exemplary PRD 10 is heat-activated, it is contemplated that the described system can be used with PRDs that are actuated by other means including, for example, electrically activated solenoids and valves responsive to manual and automatic actuation in response to triggers including temperature, pressure, chemical concentration, and other conditions and operations.

As shown in FIG. 1, in an exemplary embodiment, PRD valve 10 includes a body 12 having a bore or cavity 14 therein. Bore 14 has a longitudinal axis 16 along which piston or shuttle 18 is slideably moveable. Bore 14 is in fluid communication with high pressure port 20 and vent port 22. In FIG. 1, PRD 10 is shown in a closed configuration, wherein shuttle 18 closes communication between high pressure port 20 and vent port 22. High pressure port 20 is configured for fluid communication with a source of pressurized fluid 38 (shown in FIGS. 3-5), such as a pressure vessel or pressure cylinder, for example. Vent port 22 is configured for communication with an atmosphere outside the system, as well as with other valves 10 in the system 32.

To open PRD 10, shuttle 18 is moved to the right in the drawing FIGS. 1 and 2, in direction 24, through primary and secondary mechanisms in an exemplary embodiment. The primary mechanism is the use of a trigger element; shown by example as a SMA wire 28. The primary mechanism is not limited to a SMA design, but is any trigger element that can displace the piston through temperature input. In an exemplary embodiment, as shown in the system diagrams of FIGS. 3-5, SMA element 28a is positioned along pressure vessel 30a. In an exemplary embodiment, SMA element 28a is positioned along the pressure vessel 30a in a controlled path by use of channels, tubes, pulleys, other means, or a combination thereof and then anchored near its end 29. If SMA 28 is exposed to a temperature greater than its transition temperature, it shortens, thereby pulling shuttle 18 in direction 24. Thus, in system 32, if any pressure vessel 30a or 30b is exposed to a temperature higher than the transition temperature of SMA 28, it is expected that the high temperature will shorten the corresponding SMA 28a or 28b to an extent that pulls shuttle 18 to an open configuration of PRD 10a or 10b.

The secondary mechanism is what is termed as the sympathetic trigger. It takes place in response to the triggering of any PRD in the system, rather than in response to direct heat exposure. As a first example, when an individual PRD 10 is triggered, it is contemplated that in system 32, the opening of fluid communication between a high pressure port 20 connected to a particular pressure vessel 30 and its associated vent port 22 will pressurize fluid lines in communication with other connected PRDs 10, so that a PRD 10 is also actuated by pressurized fluid flowing through vent port 22 in direction 34 (labeled in FIG. 1). Thus, in a sympathetic actuation mode, pressurized fluid flowing from a different pressure vessel 30, in direction 34, will serve to push shuttle 18 to the right in direction 24, thereby opening a vent path between high pressure port 20 and vent port 22. After opening the vent path, pressurized fluid can flow in direction 36 (labeled in FIG. 2).

Alternatively or additionally, the sympathetic trigger may be handled electrically through the actuation of a solenoid 26, to push shuttle 18 in direction 24. Such a solenoid 26 in an exemplary embodiment is activated by communication with an associated controller attached to one or more sensors monitoring the system for a primary trigger, such as increased temperature, pressure, chemical concentration, or other sensed conditions. If the sensors associated with solenoid 26 sense a primary trigger, solenoid 26 activates and thereby pushes shuttle 18 to the right in direction 24, to an extent sufficient to open a fluid communication path between high pressure port 20 and vent port 22, as shown in FIG. 2. However, it is contemplated that other mechanisms for opening PRD 10 can be utilized, including other mechanisms that may be actuated by other mechanical and/or electrical means.

As shown in FIG. 2, evacuation of pressurized fluid from a connected cylinder or pressure vessel is accomplished by a flow of the pressurized fluid through from the pressure vessel through high pressure port 20 and out vent port 22 in direction 36. While particular structures and functions of components in PRD 10 are illustrated in an exemplary embodiment, it is contemplated that system 32 can be used with PRDs of other structures and configurations.

Figure 3:
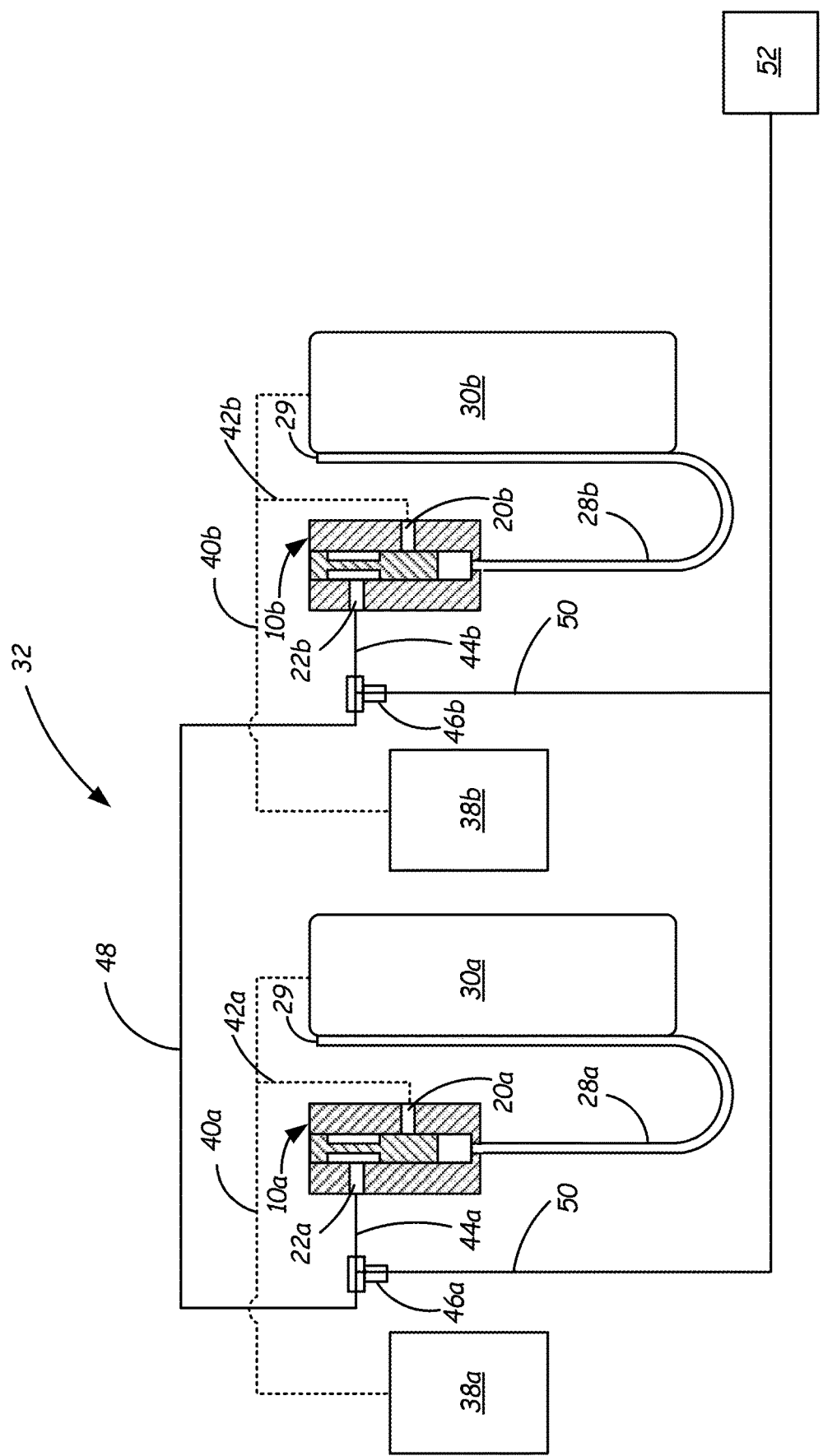
FIG. 3 is a schematic diagram of an exemplary system in which the pressure release devices are closed.

FIG. 3 is a schematic view of an exemplary system 32, having two sets, designated "a" and "b," of a pressurized fluid source 38, pressure vessel 30, trigger element 28, PRD 10, and associated conduits and connectors. While two respective sets of these elements are described, it is contemplated that many more analogous sets can be used in a similar system. When referring to an element in general in this disclosure, and not to a particular element of a particular set, we will use the numerical designation for a particular element, without the "a" or "b." Moreover, while particular configurations and connections of elements are illustrated in the exemplary system, it is contemplated that the elements may be arranged differently, and the teachings of the system can be applied to systems using more or fewer elements, including components not described. Additionally, a system may combine elements, such as using a single pressurized fluid source 38 for both pressure vessels 30a, 30b, for example.

Figure 4:
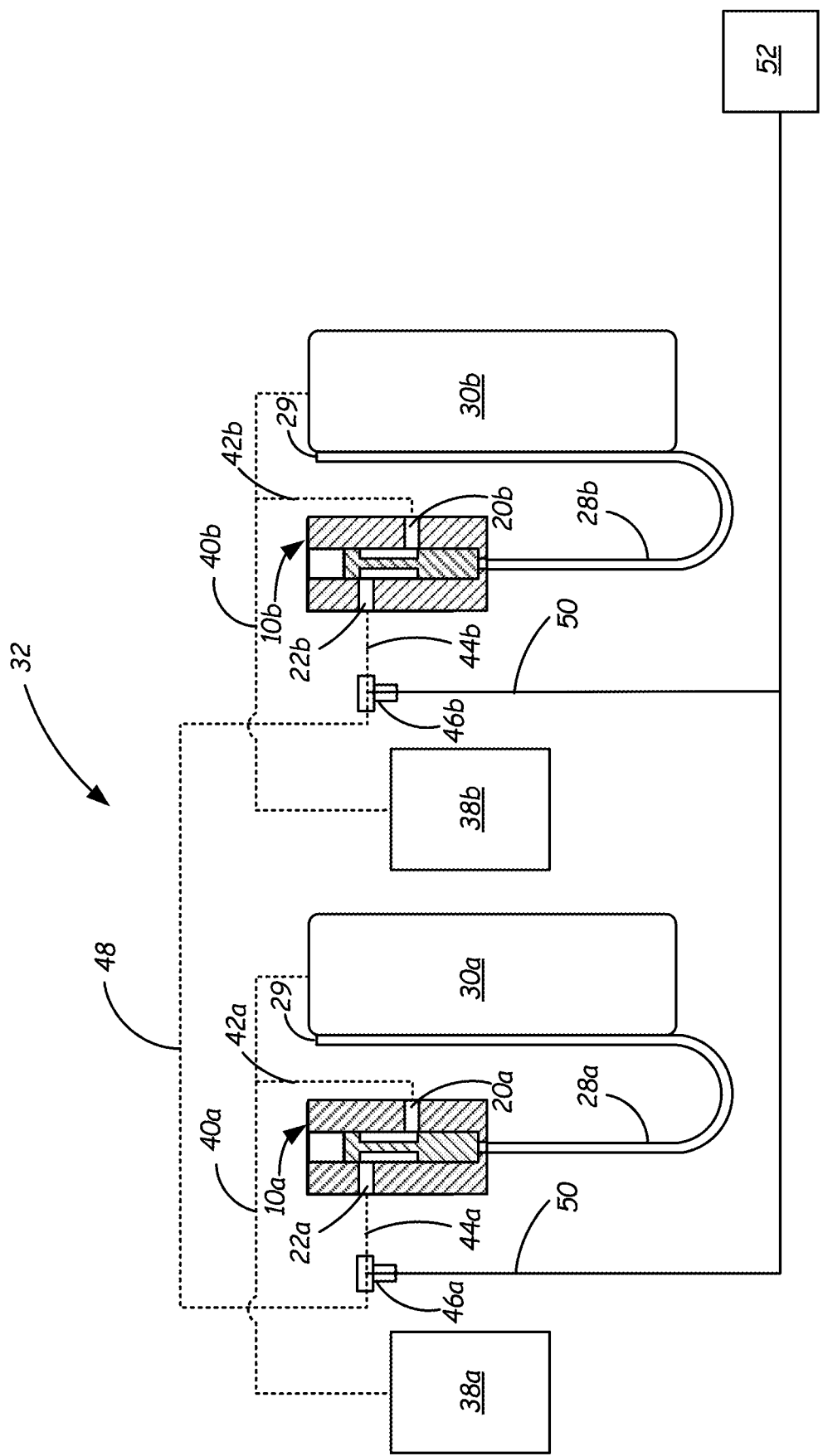
FIG. 4 is similar to FIG. 3 but shows all the pressure release devices of the system in an open configuration, where an opening of a second pressure release device has been sympathetically triggered by fluid pressure communicating through the first pressure release device.
Figure 5:
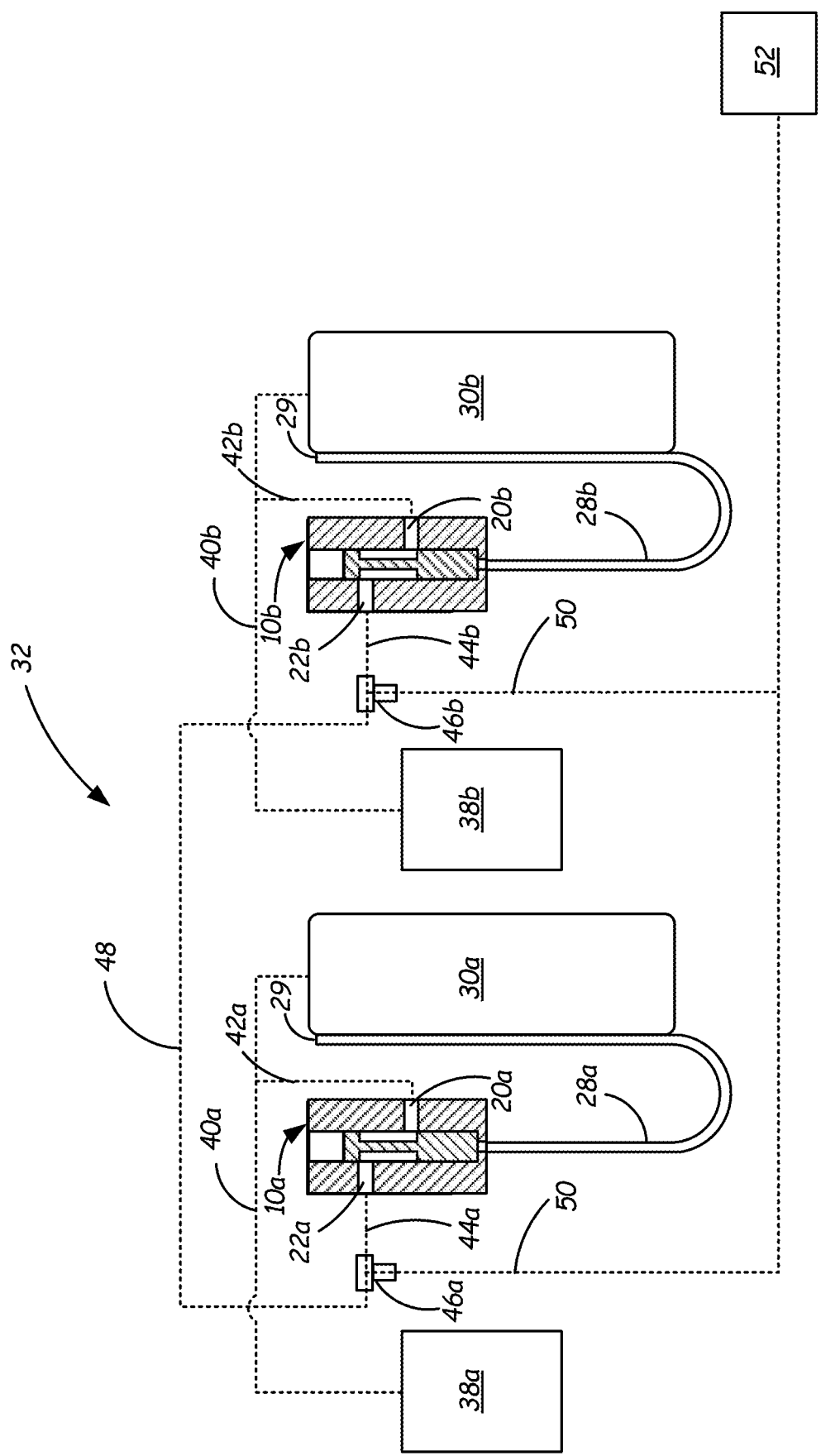
FIG. 5 is similar to FIGS. 3 and 4 but shows all lines as pressurized (represented by short dashed lines) to providing for venting of the system.

In FIGS. 3-5, pressurized conduits are represented by short dashed lines, and non-pressurized conduits are represented by solid lines. Line 40 connects pressurized fluid source 38 to its respective pressure vessel 30. Note that in FIG. 3, in routine use of system 32, a pressurized conduit 40 communicates high-pressure fluid from pressurized fluid source 38 to pressure vessel 30. The high-pressure fluid communicates through pressurized conduit 42 to PRD 10. In normal operation, PRD 10 is closed, as shown in FIG. 1, so that there is no fluid communication between high pressure port 20 and vent port 22. Accordingly, vent conduit 50 is not pressurized, as depicted by the solid line.

Conduit 42 connects each pressure release device 10 to its respective pressure vessel 30, such as at high-pressure port 20 of PRD 10. FIG. 3 depicts system 32 in a normal operation state, wherein pressure vessel 30 contains fluid at an elevated pressure compared to an atmospheric pressure, such pressurized fluid being supplied from pressurized fluid source 38. High pressure port 20 of each PRD 10 is closed by shuttle 18 (as in FIG. 1). Accordingly, while conduit 42 between PRD 10 and pressure vessel 30 is pressurized by fluid from the connected pressure vessel 30, conduit 44 connected to vent port 22 is not thereby pressurized. Conduit 44 branches off at tee connection 46 into trigger conduit 48 and vent conduit 50. Each vent conduit 50 terminates in vent 52, which can be an outlet to the atmosphere.

In the operation of system 32, PRD 10a associated with pressure vessel 30a, may open by the primary activation of 1) the trigger element 28 due to elevated temperatures above a desired temperature in the vicinity of pressure vessel 30a; and/or 2) activation of a solenoid 26 due to elevated temperatures at connected sensors. Additionally PRD 10a may open by the secondary sympathetic actuation as explained below. A threshold temperature over which PRD 10 opens may be calibrated by the selection of control parameters for solenoid 26, and/or dimensions and materials of SMA element 24, and/or calibration of a pressure force required in direction 34 to move shuttle 18, for example. Moreover, while PRDs as described respond to a threshold temperature, it is contemplated that the system can also be triggered in response to other environmental conditions, including but not limited to pressure or the sensed concentration of certain air components.

In an exemplary embodiment where pressure is used as the secondary sympathetic trigger, each tee connector 46 is configured to preferentially direct pressurized fluid flow preferentially through trigger conduit 48 rather than to vent conduit 50. Thus, as shown in FIG. 4, if either PRD 10 is activated so that fluid communication is allowed between high pressure port 20 and vent port 22, such flow pressurizes conduit 44 connected to vent port 22. This pressurized fluid flows through tee connector 46 to then pressurize trigger conduit 48, as shown in FIG. 4. Such fluid pressure in trigger conduit 48 then enters vent port 22 of all other connected PRDs 10 in system 32, to open those other PRDs 10 by fluid pressure pushing on shuttles 18 in direction 34, as shown in FIG. 1. Thus, all PRDs 10 in system 32 will be opened automatically in a sympathetic mode upon the triggering of at least one PRD 10. Each PRD 10 will open according to one or more of the primary and secondary mechanisms discussed above; namely, first, displacement of shuttle 18 by the actuation of a trigger element 28 or activation of the solenoid 26 from connected sensors such as temperature sensors; second, displacement of shuttle 18 in direction 24 due to sympathetic back pressure actuation through vent port 22 from the venting of other pressure vessels 30 in the connected system 32 or sympathetic solenoid activation.

As shown in FIG. 5, after all connected PRDs 10 in system 32 have been opened, excess pressurized fluid from pressure vessel 30 and/or pressurized fluid sources 38 is directed by tee connection 46 to vent lines 50, to ultimately exhaust to the atmosphere (or a suitable exhaust receiving chamber) at vent 52. While conduit 44a is illustrated as connecting vent port 22 and tee connector 46, it is contemplated that in a different embodiment, a split for trigger conduit 48 and vent conduit 50 can be plumbed or built directly into PRD 10.

The disclosed system 32 provides for automatic, sympathetic activation of all PRDs 10 in the system 32, in response to the opening of any one of the connected PRDs 10. Such a design reduces the time needed for individual mechanical triggering of PRDs in a system. Moreover, a vent flow rate of the system can be increased by having all connected PRDs 10 open nearly simultaneously. Thus, system 32 is simpler and more reliable in emergency situations than systems that merely use the primary mechanisms.

In an exemplary embodiment using pressure imbalance as the secondary trigger, PRD 10 is designed so that a relatively small pressure imbalance (i.e., a differential between atmospheric pressure and a pressure of fluid flowing in direction 34 of vent port 22) would be required to move shuttle 18 to the open position shown in FIG. 2.

An exemplary, non-limiting embodiment of system 32 includes first valve 10a and second valve 10b. The first valve 10a is fluidly connected to a first vessel 30a and the second valve 10b fluidly connected to a second vessel 30b. First valve 10a includes body 12 and piston 18. Body 12 includes bore 14 having longitudinal axis 16, first port 20 and second port 22. First port 20 is in fluid communication with bore 14 and an interior of the first vessel 30a. Second port 22 is in fluid communication with bore 14, in fluid communication with the second valve 10b, and in fluid communication with an atmosphere 52 exterior to the first vessel 30a. Piston 18 is disposed within bore 14 and is movable along longitudinal axis 16. A first position of the piston 18 blocks the first port 20, as shown in FIG. 1. A second position of the piston 18 allows fluid communication between the first port 20 and the second port 22, as shown in FIG. 2. First valve 10a is configured so that fluid pressure from the second valve 10b communicating through the second port 22 urges the piston 18 to the second position.

In an exemplary embodiment, a trigger element 28 has a first end connected to piston 18. The fusible element 28 has a first position, wherein piston 18 is in its first position (closed), shown in FIG. 1. Exposure of the trigger element 28 to a threshold condition causes the trigger element 28 to urge the piston 18 to the second position (open), shown in FIG. 2. In an exemplary embodiment, the trigger element 28 is a shape memory alloy element, and the threshold condition is a temperature at or exceeding its transformation temperature. As shown in FIGS. 3-5, at least a portion of the trigger element 28a is positioned along the first vessel 30a. In an exemplary embodiment, system 32 further includes solenoid 26, which is configured to push piston 18 from the first position (shown in FIG. 1) to the second position (shown in FIG. 2) in direction 24. This solenoid can be used for primary or secondary triggering.

In an exemplary embodiment, system 32 includes trigger conduit 48 through which the fluid pressure from the second valve 10b is communicated to the second port 22a of first valve 10a. In an exemplary embodiment, system 32 includes vent conduit 50 and connector 46a between second port 22a, trigger conduit 48, and vent conduit 50. Connector 46a allows fluid communication between the trigger conduit 48 and the second port 22a until a threshold pressure level in trigger conduit 48 is reached, causing a secondary sympathetic trigger. Connector 46a allows fluid communication between trigger conduit 48 and vent conduit 50 when the threshold pressure level in trigger conduit 48 is exceeded. In an exemplary embodiment, connector 46a allows communication between second port 22a and vent conduit 50 when the threshold pressure level in trigger conduit 48 is exceeded.

Although the subject of this disclosure has been described with reference to several embodiments, workers skilled in the art will recognize that changes may be made in form and detail without departing from the scope of the disclosure. In addition, any feature disclosed with respect to one embodiment may be incorporated in another embodiment, and vice-versa.

The invention claimed is:

1. A system including a first valve and a second valve, the first valve fluidly connected to a first vessel and the second valve fluidly connected to a second vessel, the system comprising:
the first valve including:
a body including:
a bore;
a first port in fluid communication with the bore and an interior of the first vessel; and
a second port in fluid communication with the bore, in fluid communication with the second valve, and in fluid communication with an atmosphere exterior to the first vessel; and
a piston movably disposed within the bore, wherein:
a first position of the piston blocks the first port; and
a second position of the piston allows fluid communication between the first port and the second port; and
a trigger conduit through which fluid pressure from the second valve is capable of being communicated to the second port, thereby urging the piston to the second position.

2. The system of claim 1 including a trigger element connected to the piston and having two states, wherein:
the piston is in the first position when the trigger element is in a first state; and
exposure of the trigger element to a threshold condition causes the trigger element to urge the piston to the second position.

3. The system of claim 2, wherein the trigger element is a shape memory alloy element, wherein:
at least a portion of the shape memory element is positioned along the first vessel; and
the threshold condition is a temperature at or exceeding a transition temperature of the shape memory alloy element.

4. The system of claim 1 including a solenoid configured to push the piston from the first position to the second position.

5. The system of claim 1 including:
a vent conduit; and
a connector between the second port, the trigger conduit, and the vent conduit.

6. The system of claim 1 comprising a first pressurized fluid source connected to the first vessel.

7. The system of claim 6 comprising a second pressurized fluid source connected to the second vessel.

8. The system of claim 5 comprising a vent connected to the vent conduit.

9. The system of claim 8 wherein the vent is connected to the second valve.

10. The system of claim 1 wherein fluid pressure from the first valve is capable of being communicated to the second valve through the trigger conduit.

11. The system of claim 2, wherein the trigger element is located along an outside surface of the first vessel.

12. The system of claim 2, wherein the trigger element is activated by heat.

13. The system of claim 2, wherein the trigger element is activated electrically.

* * * * *